(12) United States Patent
Sakai et al.

(10) Patent No.: US 6,882,713 B2
(45) Date of Patent: Apr. 19, 2005

(54) TELEPHONE APPARATUS

(75) Inventors: Hajime Sakai, Fukuoka (JP); Youji Manabe, Fukuoka (JP); Toshiaki Sakiyama, Fukuoka (JP); Yuji Hirai, Fukuoka (JP); Hideyuki Matsuo, Fukuoka (JP); Kentaro Oka, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/735,673

(22) Filed: Dec. 13, 2000

(65) Prior Publication Data

US 2002/0126815 A1 Sep. 12, 2002

(30) Foreign Application Priority Data

Dec. 13, 1999 (JP) ............................................ 11-352947
Dec. 24, 1999 (JP) ............................................ 11-367199

(51) Int. Cl.[7] .............................................. H04M 1/56
(52) U.S. Cl. ............................ 379/142.06; 379/142.09; 379/142.17
(58) Field of Search ....................... 379/142.06, 142.07, 379/142.01, 354, 376.013, 373.01, 373.03, 142.08, 142.09, 142.17; 455/412–415, 461, 412.2, 412.1, 566

(56) References Cited

U.S. PATENT DOCUMENTS 4,924,496 A * 5/1990 Figa et al. .................. 379/131
5,265,145 A 11/1993 Lim
5,452,346 A * 9/1995 Miyamoto ............. 379/142.04

(Continued)

FOREIGN PATENT DOCUMENTS

| CA | 2 105 543 A1 | 3/1995 |
| DE | 195 43 040 A1 | 5/1997 |
| DE | 197 54 994 A1 | 6/1999 |
| DE | 198 17 041 A1 | 10/1999 |

(Continued)

OTHER PUBLICATIONS

International Search Report for corresponding application no. GB 0030266.1 dated Oct. 29, 2001.*
Further Search Report, dated May 30, 2002 for GB 0030266.1.
Further Search and Examination Report, dated May 29, 2002 for GB 0030266.1

Primary Examiner—Curtis Kuntz
Assistant Examiner—Barry W Taylor
(74) Attorney, Agent, or Firm—RatnerPrestia (57) ABSTRACT

A received telephone number is classified into group and stored by a simple operation, and is used as the telephone number when making a call.

It comprises a telephone number detector (2) for detecting an incoming telephone number from a telephone line, an operation unit (13) for specifying the group of the detected telephone number, a memory (11) for storing the information of the specified group and the telephone number in correspondence, and LED (15a–15d, 19a–19b) for displaying multiple colors. In the incoming operation, the lamp color is changed to display which group the received telephone number belongs to, and the call receiver easily recognizes the call is from which specific group. Further, when dialing by making use of the stored telephone number, the telephone number is displayed and searched in each group.

5 Claims, 11 Drawing Sheets

U.S. PATENT DOCUMENTS

| | | | |
|---|---|---|---|
| 5,602,908 A | * | 2/1997 | Fan |
| 5,644,629 A | * | 7/1997 | Chow |
| 5,920,615 A | | 7/1999 | Noide |
| 5,946,636 A | * | 8/1999 | Uyeno et al. ............... 455/566 |
| 6,289,084 B1 | * | 9/2001 | Bushnell .................... 379/67.1 |
| 6,690,955 B1 | * | 2/2004 | Komiyama ................ 455/566 |
| 2002/0009184 A1 | * | 1/2002 | Shnier .................. 379/142.01 |

FOREIGN PATENT DOCUMENTS

| | | |
|---|---|---|
| EP | 0 624 966 A2 | 11/1994 |
| EP | 0 886 418 | 12/1998 |
| EP | 0 899 927 A1 | 3/1999 |
| EP | 0 901 263 A2 | 3/1999 |
| EP | 0 999 682 | 5/2000 |
| GB | 2 297 665 | 8/1996 |
| GB | 2 308 038 A | 6/1997 |
| GB | 2333392 A | 7/1999 |
| GB | 2 333 392 | 7/1999 |
| GB | 2 349 775 | 11/2000 |
| JP | 5-191497 | 7/1993 |
| JP | 11-136319 | 5/1999 |
| JP | 11-136319 A | 5/1999 |

* cited by examiner

TELEPHONE APPARATUS

BACKGROUND OF THE INVENTION

1. Field of the Invention

The present invention relates to a telephone apparatus for receiving caller's information such as telephone number at incoming time.

2. Description of the Related Art

Recently, when sending a bell signal, service of sending caller's telephone number is available. By this service, at the called side telephone, it is known who is the caller before answering the call. In other words, it is possible to judge whether or not to answer the call.

However, if the telephone number is not borne in mind, it is not known who is called if only the caller's telephone number is displayed. Hence, it is proposed to use a telephone apparatus capable of displaying the name of the caller stored in relation to the telephone number, when called, by preliminary storing the telephone number and corresponding caller's name in the telephone apparatus.

In other telephone apparatus, a specific telephone number is stored in the telephone apparatus, and when the specific telephone number is received, a particular ringing tone is emitted to distinguish the call.

Further, in a cordless telephone apparatus having plural sub units, the following function may be provided. That is, when receiving an incoming bell, the telephone apparatus once receives it automatically, and sends a response message to urge a sub unit call. The calling side, according to this instruction, operates by remote control, and calls a specific sub unit. Such function is called a remote control switch function.

However, in the conventional telephone apparatus corresponding to such caller's telephone number transmission service, when registering the specific telephone number and the caller's name, it is required to enter the number and name by pressing a dial button for each numeral or character. The operation is hence very complicated, and involves possibility of wrong input.

It is also a problem that the telephone number information received previously cannot be utilized effectively.

On the other hand, in a cordless telephone apparatus having plural sub units, the caller is forced to operate by remote control to specify the sub unit upon every call.

SUMMARY OF THE INVENTION

The invention is devised in the light of the above problems, and the telephone apparatus of the invention comprises an information detector for detecting the transmitted caller's information, an operation unit for specifying a group of caller's information, a memory for storing the caller's information and specified group information, a display unit, and a controller. The controller displays the caller's information in the display unit, and searches the information in the memory, and when finding the information coinciding with the caller's information, the caller's information is shown in the display unit so as to identify the group of the caller's information.

Also, the telephone apparatus of the invention comprises an information detector for detecting the transmitted caller's information, an operation unit for instructing registration of caller's information, a memory for storing the specified caller's information, a display unit, and a light source for emitting plural color lights for illuminating the display unit. The light source emits a color light when the caller's information detected by the information detector coincides with the caller's information stored in the memory and the other color light when does not coincide.

Further, the telephone apparatus of the invention comprises plural sub units, an information detector for detecting the transmitted caller's information, a caller's information memory for storing the transmitted caller's information, a response information memory for storing the sub unit information of the sub unit answering the call and the transmitted caller's information, a sub unit specifying caller's information memory for storing the sub unit information and transmitted caller's information when the answering sub unit specifies, and a controller. The controller, when detecting that the caller's information stored in the sub unit specifying caller's information memory coincides with the transmitted caller's information upon incoming, calls the sub unit corresponding to the sub unit information being read out from the sub unit specifying caller's information memory.

DESCRIPTION OF THE PREFERRED EMBODIMENTS

Referring now to the drawings, preferred embodiments of the invention are described below.

(Embodiment 1)

Figure 1:
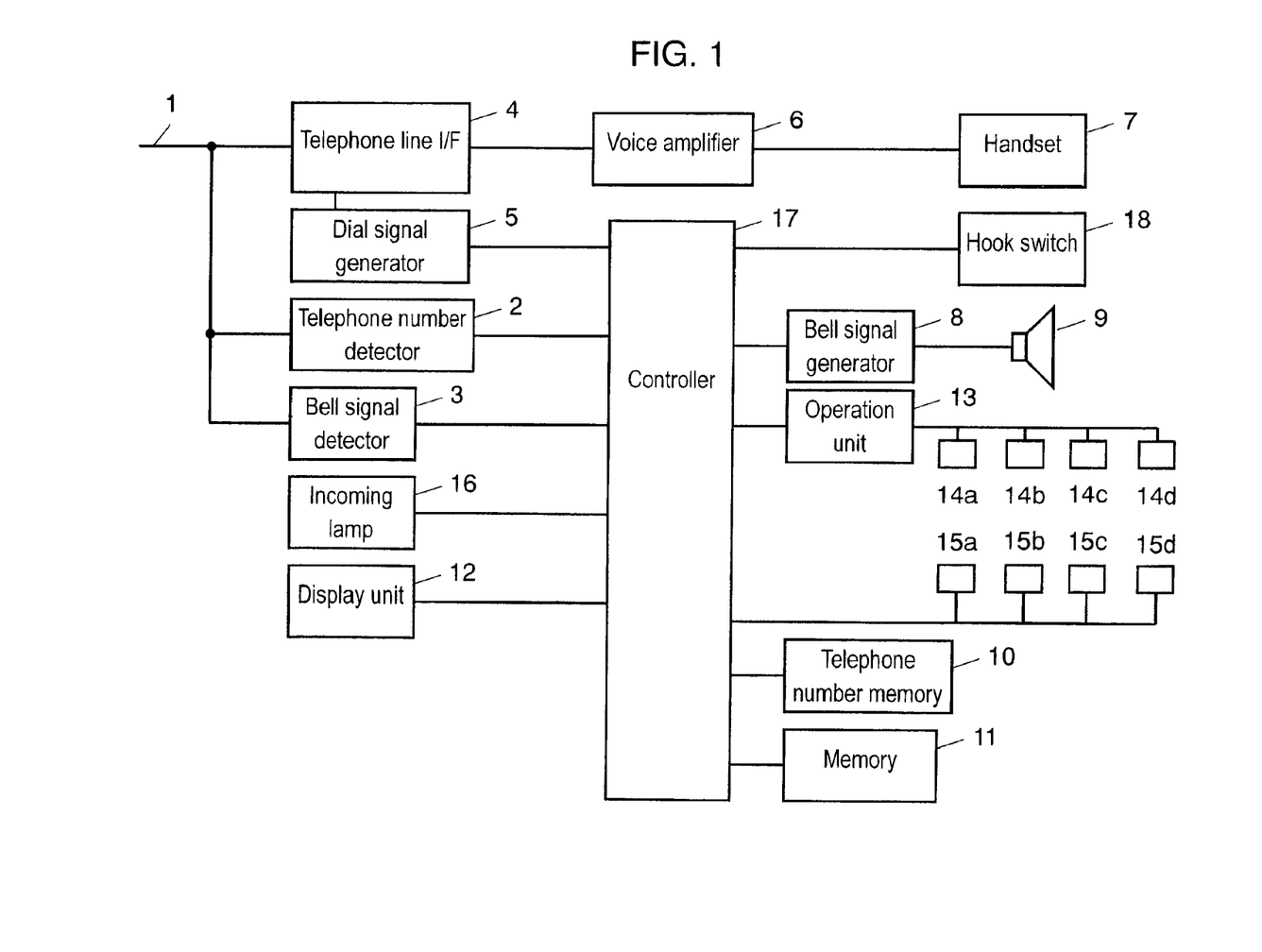
FIG. 1 is a block diagram of a telephone apparatus in a first embodiment of the invention.
Figure 2A:
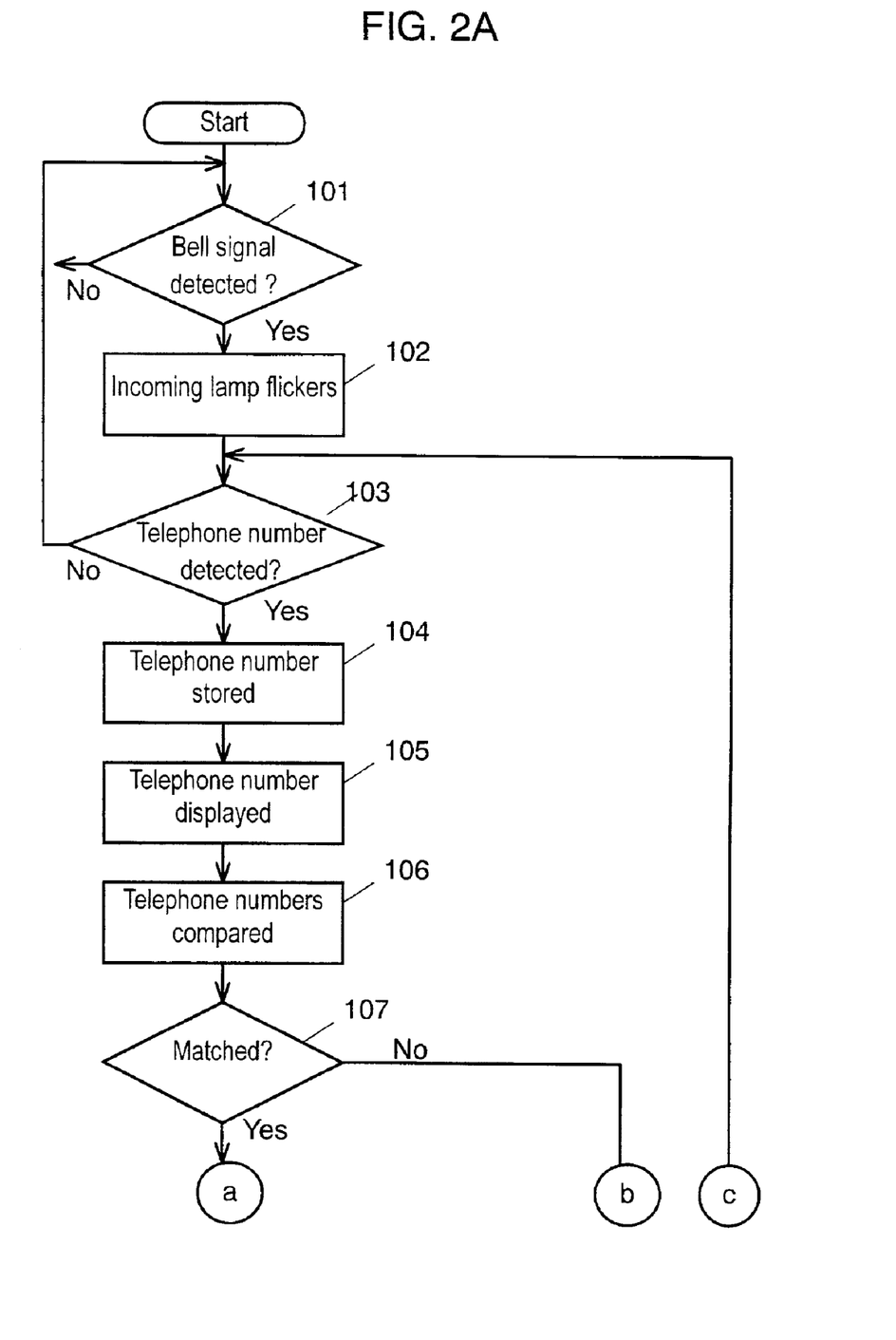
FIGS. 2A and 2B are flowcharts showing the operation of the telephone apparatus in the first embodiment of the invention.
Figure 2B:
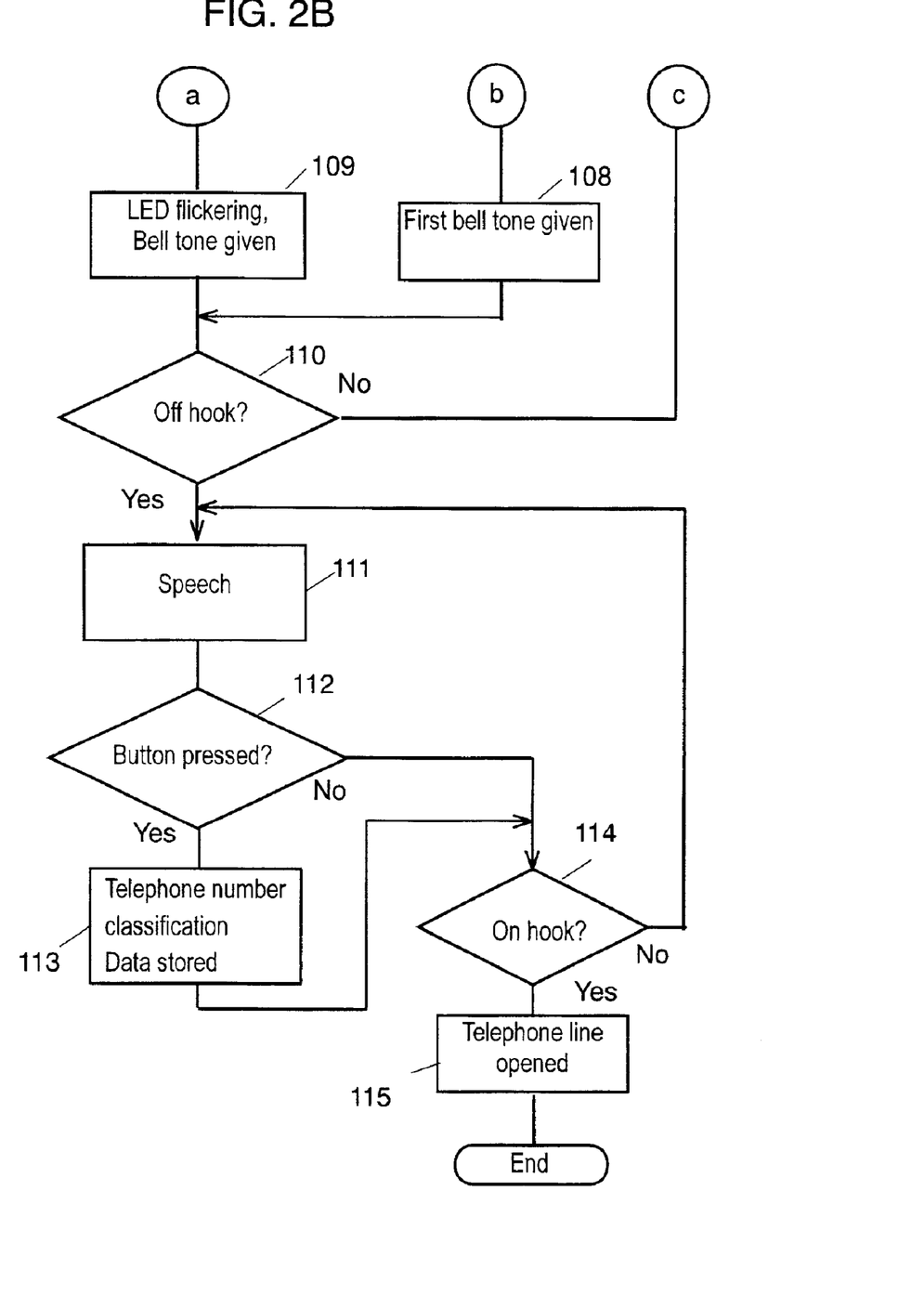
Figure 3:
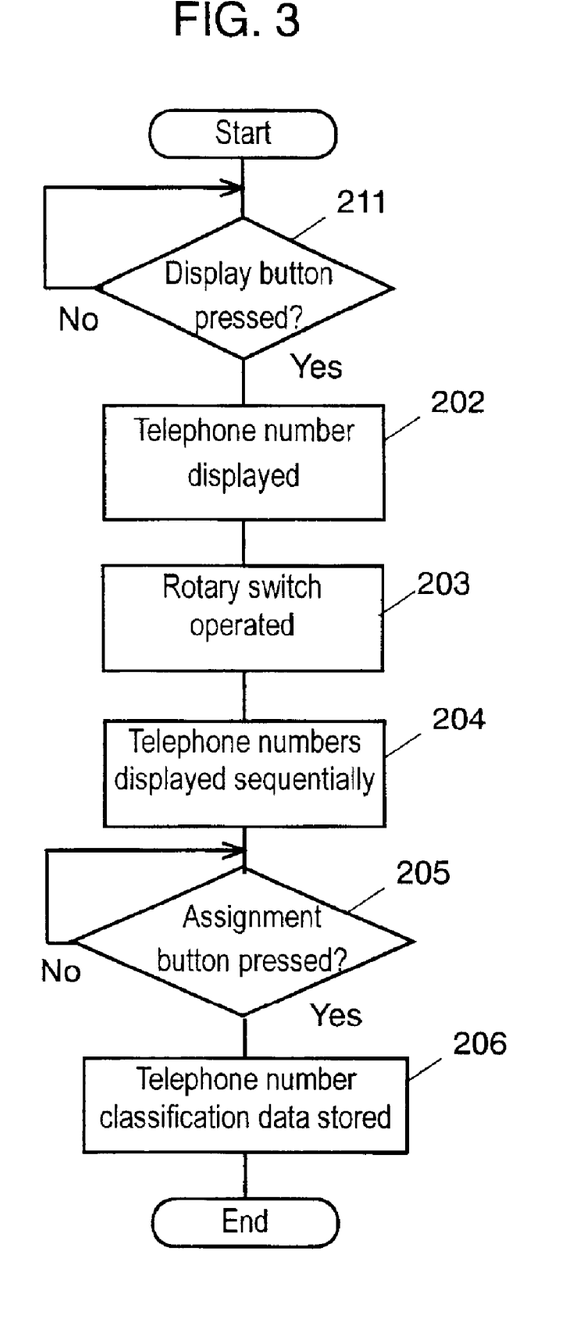
FIG. 3 is a flowchart showing the operation of the telephone apparatus in the first embodiment of the invention.
Figure 4:
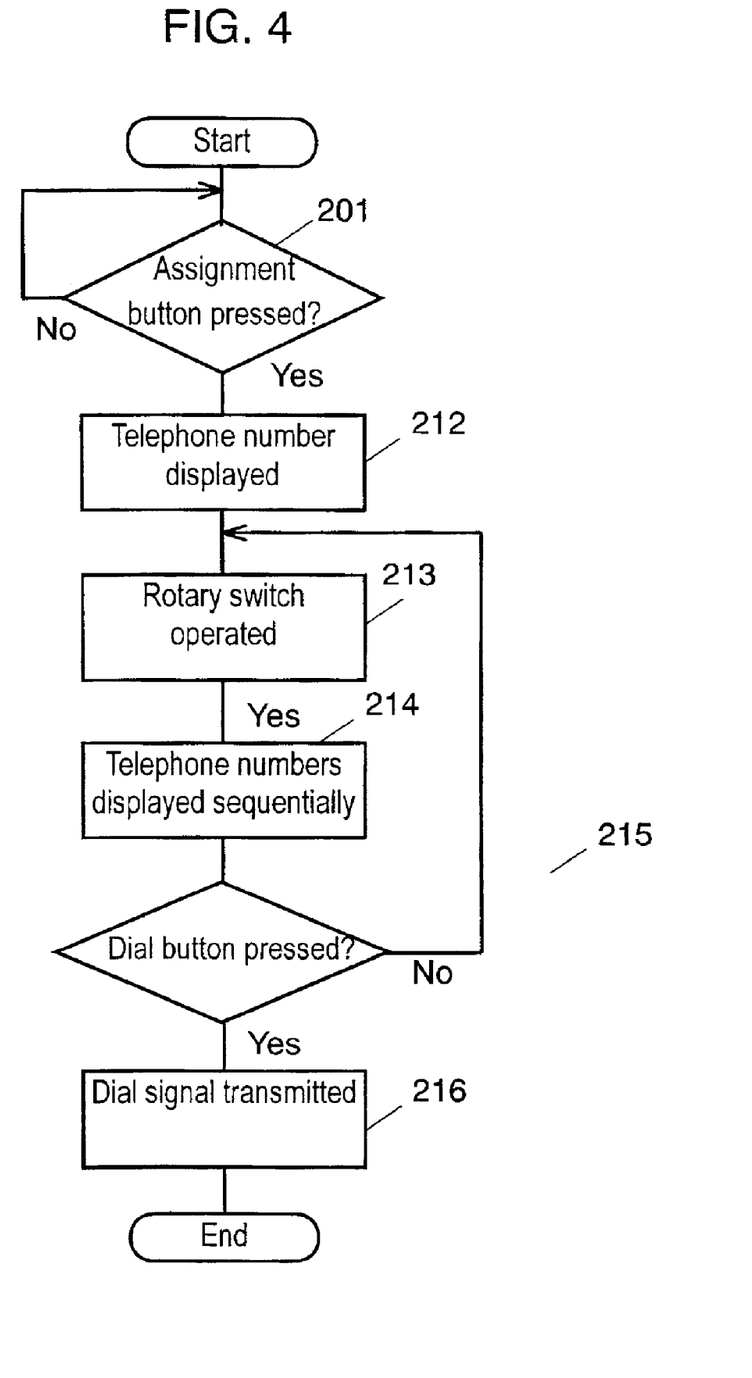
FIG. 4 is a flowchart showing the operation of the telephone apparatus in the first embodiment of the invention.

FIG. 1 is a block diagram of a telephone apparatus in an embodiment of the invention. FIGS. 2A and B, FIG. 3, and FIG. 4 are flowcharts showing the operation of the telephone apparatus in the embodiment.

First, the incoming operation of the telephone apparatus in the embodiment is explained by referring to FIG. 1 and FIGS. 2A and B.

A bell signal detector 3 detects a bell signal transmitted intermittently from a telephone line 1 (step 101), and sends a bell detection signal to a controller 17. The controller 17 flickers an incoming lamp 16 (step 102). The telephone number detector 2 is monitoring whether the caller's telephone number data is being inserted in the pause period of bell signal or not. A telephone number detector 2 detects a telephone number (step 103), and converts the telephone number data into digital data and issues to the controller 17.

The controller 17 stores the telephone number data in a telephone number memory 10 (step 104), and displays the telephone number in a display unit 12 composed of LCD (step 105). In the present incoming call, the controller 17 then compares the telephone number stored in the telephone number memory 10 with the telephone number stored in a memory 11 (step 106).

As a result of comparison, when the telephone numbers are not matched (step 107), that is, when the telephone number received in the present incoming call has not been stored in the memory 11, the controller 17 controls a bell tone generator 8, and generates a first bell tone from a speaker 9 (step 108). When the telephone numbers are matched, the following operation is processed at step 109. That is, the controller 17 reads out the group data stored in relation to the matched telephone number from the memory 11. Consequently, the LED corresponding to the group flickers, and the bell tone corresponding to the group sounds.

As shown in FIG. 1, four group buttons 14a, 14b, 14c, 14d are provided. A blue LED 15a corresponds to button 14a, red LED 15b to button 14b, yellow LED 15c to button 14c, and green LED 15d to button 14d. The button 14a is assigned to the private group "a", button 14b to business group "b", button 14c to family group "c", and button 14d to emergency group "d".

The controller 17 detects whether a handset 7 is lifted or not by means of a hook switch 18. When the handset 7 is lifted (step 110), the telephone line 1 is closed by a telephone line interface (I/F) circuit 4 to set in speech state (step 111). At this time, the speech voice is amplified by a voice amplifier.

In the speech state, when anyone of the group buttons 14a to 14d is pressed (step 112), the controller stores the telephone number stored in the telephone number memory 10 and the data expressing the group in the memory 11 by relating to each other. For example, when the partner of the speech is a family member, the group button 14c is pressed. As a result, the controller 17 stores the telephone number of the speech partner and the data expressing the group "c" in the memory 11 by relating to each other (step 113).

The controller 17 then detects the handset 7 is on hook by means of the hook switch 18 (step 114), and controls the telephone line I/F circuit 4, and opens the telephone line 1 (step 115) to terminate the speech state.

Thus, if called by a caller whose telephone number is not stored in the memory 11, the user knows that the call is from anyone not classified in telephone number from an ordinary bell tone (first bell tone) and lighting of incoming lamp 16. Besides, the telephone number receiving from the telephone line 1 can be registered by a simple operation of pressing one button only, and it is very easy to use.

When called from a caller whose telephone number has been already registered in group, one of LEDs 14a to 14d flickers according to the registered group. At the same time, the call tone corresponding to the group (one of second to fifth call tones) is generated. As a result, the caller is immediately identified.

Until the coincidence of the incoming telephone number is determined, the incoming lamp 16 is flickering and the first call tone continues to ring, the user immediately knows the incoming of a call.

The telephone number can be registered in the group also after finishing the call, as explained below by reference to FIG. 3.

When the handset is hooked and the call is over (in this state, the display unit 12 is showing, for example, the present time), a display button (not shown) of the operation unit 13 is pressed (step 201), then the controller 17 reads out the latest telephone number stored in the telephone number memory 10, and displays the telephone number in the display unit 12 (step 202).

When a rotary switch (not shown) of the operation unit 13 is turned (step 203), the controller 17 reads out the telephone numbers stored in the telephone number memory 10 sequentially, and displays in the display unit 12 (step 204). At this time, the display sequence is preferred to be a reverse sequence of recording sequence. While the telephone number desired to be registered is being thus displayed, one of group buttons 14a to 14d is selected and pressed (step 205), and the displayed telephone number and selected group data are stored in the memory 11 in relation to each other (step 206). For example, when the private group button 14a is pressed, the controller 17 stores the telephone number stored in the telephone number memory 10 and the group "a" data in the memory 11 in relation to each other. In this way, if failing to register in the group during the call, it can be registered later by a simple operation.

The outgoing operation by using the telephone number registered in the group is explained by referring to FIG. 4.

The user selects and presses one of the group buttons 14a to 14d (step 211). The controller 17 searches the telephone number stored in the memory 11, and displays the latest registered telephone number in the group in the display unit 12 (step 212). For example, when the private group button 14a is pressed, the controller 17 searches the telephone number data stored in the memory 11, and reads out the latest registered telephone number from the telephone numbers provided with group "a" data, and displays in the display unit 12.

Next, the user turns the rotary switch (not shown) of the operation unit 13 (step 213). According to the operation, the controller 17 displays the telephone numbers of the selected group in the sequence of newer registration (step 214). For example, when group "a" is selected, group "a" telephone numbers out of the telephone numbers stored in the memory 11 are displayed sequentially from the newest one. When a desired telephone number is shown in the display 12, the dial button (not shown) of the operation unit 13 is pressed (step 215), then the controller 17 closes the telephone line 1 by the telephone line I/F circuit 4. Consequently, the controller 17 generates a dial signal of the telephone number displayed in the display unit 12 in the dial signal generator 5, and sends out to the telephone line 1 (step 216).

Thus, according to the embodiment, the telephone numbers entered from the telephone line can be classified into groups and stored, and when making a call, a telephone number can be searched in each group and dialed. As a result, the convenience of use is outstandingly improved, and the telephone number data transmission service can be utilized effectively.

In the embodiment, the telephone number is detected, stored and compared, but not limited to the telephone number, the name or other information entered from the telephone line may be similarly utilized.

In the embodiment, the line for entering the telephone number is a telephone line of a wired communication line, but it may be also realized by a wireless communication line. In such a case, the telephone apparatus is a cellular phone.

(Embodiment 2)

Figure 5:
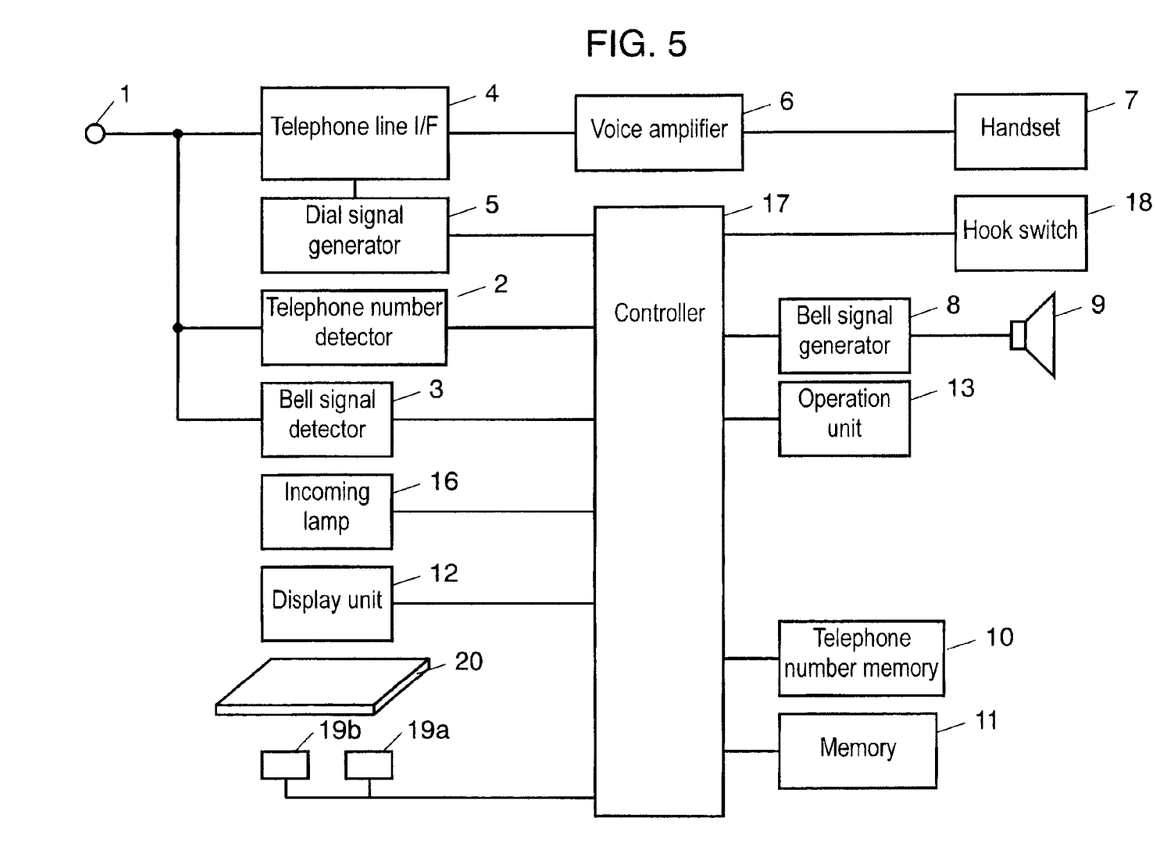
FIG. 5 is a block diagram of a telephone apparatus in a second embodiment of the invention.
Figure 6:
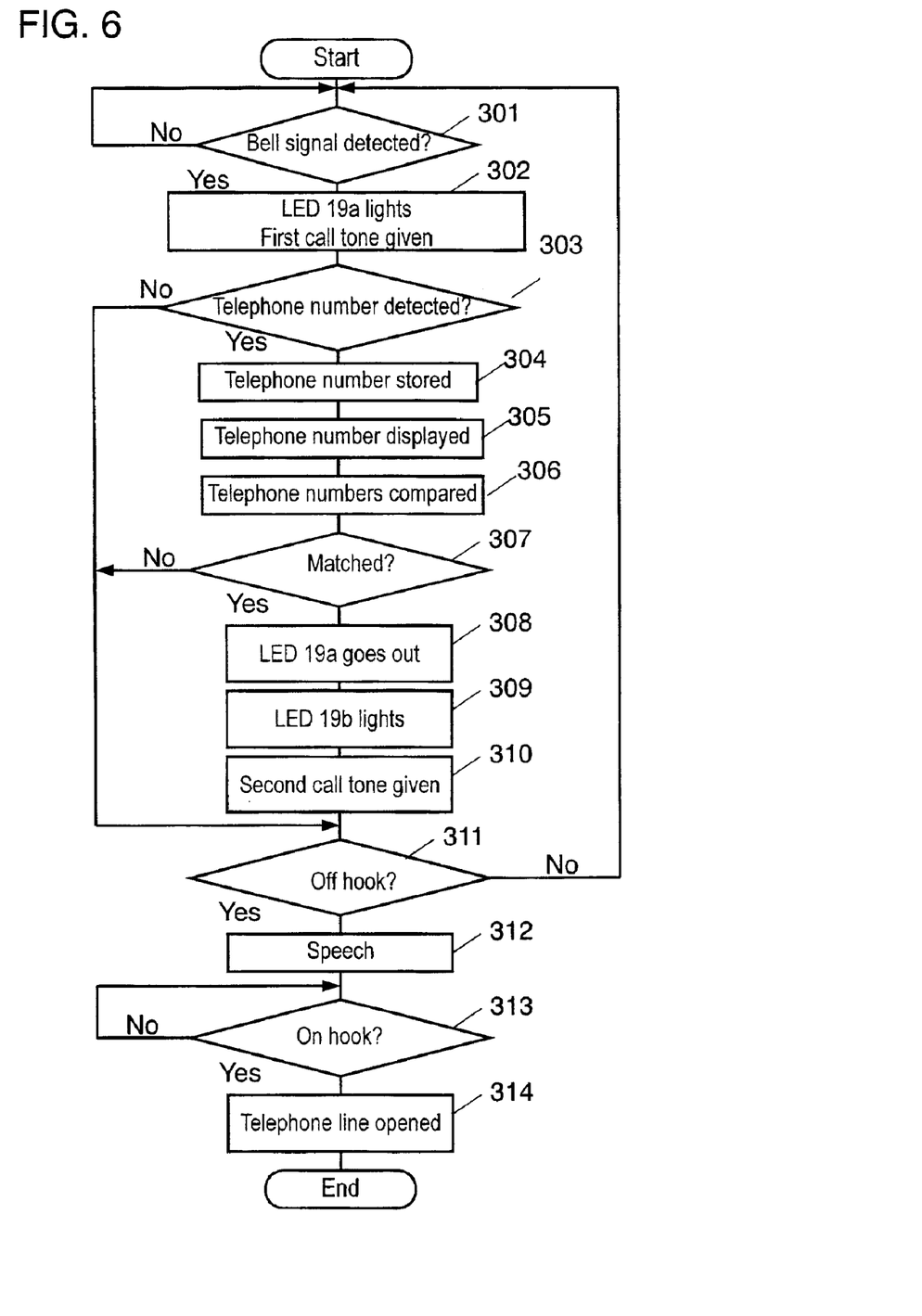
FIG. 6 is a flowchart showing the operation of the telephone apparatus in the second embodiment of the invention.
Figure 7:
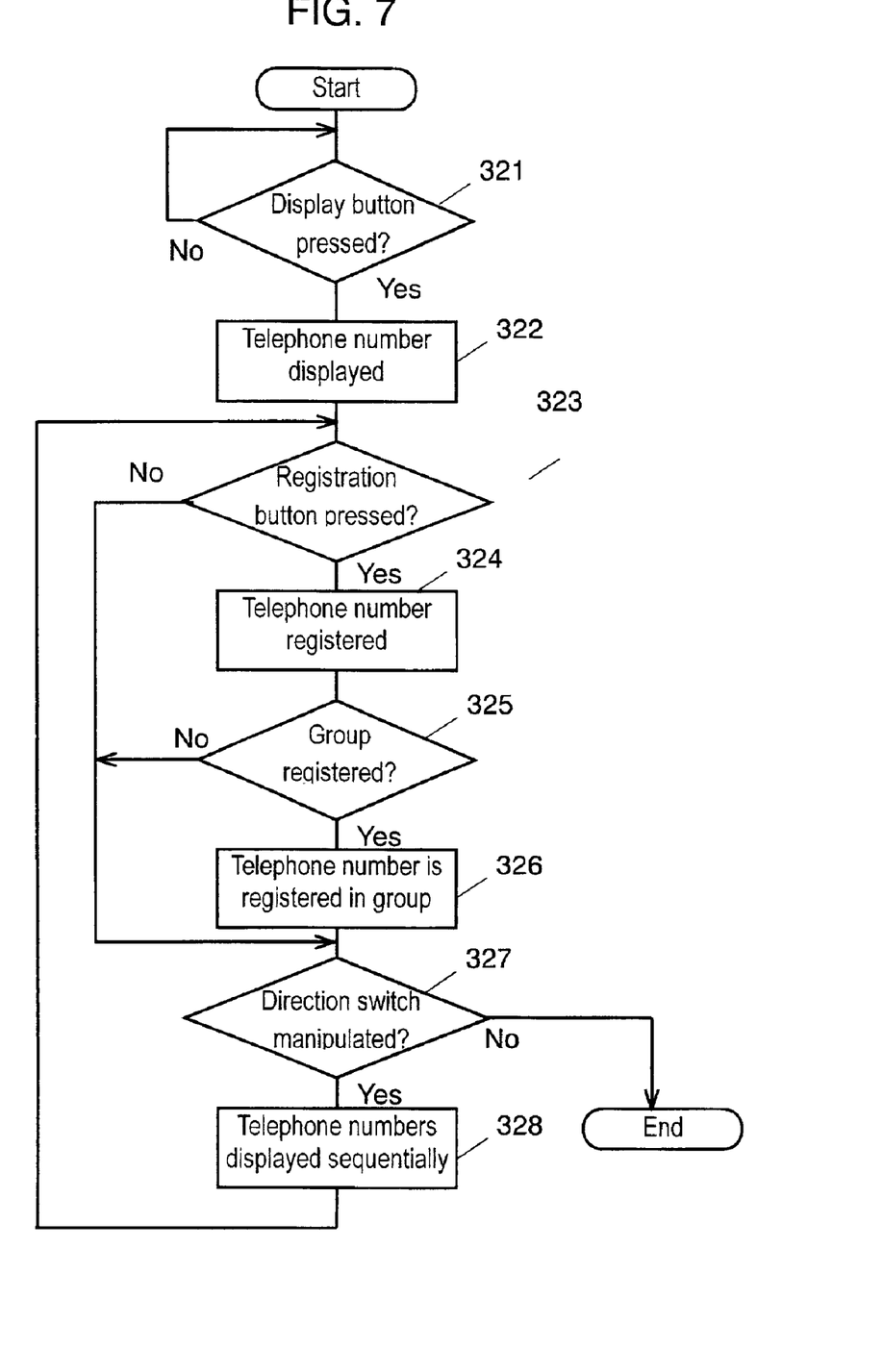
FIG. 7 is a flowchart showing the operation of the telephone apparatus in the second embodiment of the invention.

FIG. 5 is a block diagram of a telephone apparatus in embodiment 2 of the invention. FIG. 6 and FIG. 7 are flowcharts showing the operation of the telephone apparatus in the embodiment.

In FIG. 5, the group buttons 14a to 14d and LEDs 15a to 15d shown in FIG. 1 are eliminated, and a green LED 19a and a red LED 19b which are backlights of the display unit 12 composed of LCD, and a backlight guide plate 20 for the LCD for composing the display unit 12 are provided. The others are same as in FIG. 1, and description of individual components is omitted.

First the operation of the telephone apparatus of the embodiment is explained by reference to FIG. 5 and FIG. 6.

A bell signal detector 3 detects a bell signal transmitted intermittently from a telephone line (step 301), and sends a bell detection signal to a controller 17. The controller 17, when receiving the bell detection signal, lights up the green LED 19a which is a backlight of the display unit 12 (step 302). At the same time, the controller 17 controls a bell tone generator 8, and generates a first bell tone from a speaker 9 (step 302).

A telephone number detector 2 is monitoring input of telephone number data from a call inserted in a pause period of bell signal from the telephone line 1. The telephone number detector 2 detects a telephone number (step 303), and converts the detected telephone number data into digital data and issues to the controller 17. The controller 17 stores the telephone number data in a telephone number memory 10 (step 304), and displays the telephone number in a display unit 12 composed of LCD (step 305).

In the present incoming call, the controller 17 then compares the telephone number stored in the telephone number memory 10 with the telephone number stored in a memory 11 (step 306).

As a result of comparison, when the telephone numbers are matched (step 307), that is, when the received telephone number is stored as group in the memory 11, the controller 17 puts out the LED 19a (step 308), and lights up a red backlight LED 19b (step 309).

Next, the controller 17 controls the bell signal generator 8, and generates a second bell tone (step 310). The controller 17 is monitoring whether a handset 7 is lifted or not by means of a hook switch 18. When the handset 7 is lifted (step 311), the controller 17 closes the telephone line 1 by a telephone line I/F circuit 4 to set in speech state (step 312). When the handset 7 is on hook (step 313), the telephone line is opened (step 314) to terminate the speech state.

If the telephone number is not detected at step 303 or if the telephone numbers are not matched at step 307, the LED 19a is lit and the first call tone sounds continuously until the handset 7 is off hook (step 311).

Thus, according to the embodiment, since the LED for identifying the caller is used as the light source of the backlight of the LCD, the displayed telephone number is easier to see. The display is shown by the LED alone, and hence the display area is wider. As a result, it is easier to see from a remote distance.

The method of registering the telephone number entered from the telephone line 1 into group is explained by referring to FIG. 7.

In the waiting state when the call is over and the handset is on hook, the display unit 12 is showing the present time.

In this state, when a display button (not shown) of the operation unit 13 is pressed (step 321), the controller 17 reads out the latest telephone number stored in the telephone number memory 10, and displays the telephone number in the display unit 12 (step 322). When a registration button (not shown) of the operation unit 13 is pressed, the displayed telephone number is stored in the memory 11 (step 324). Next, by pressing a group registration button (not shown) of the operation unit 13 (step 325), the telephone number is registered as group in the memory 11 (step 326).

When a direction switch (not shown) of the operation unit 13 is pressed (step 327), other telephone number stored in the telephone number memory 10 is shown in the display unit 12 (step 328). At this time, the display sequence is preferred to be a reverse sequence of recording sequence. By executing steps 323 to 325, the telephone number and its group can be registered. The telephone number stored in the memory 11 can be used for making a call.

In the embodiment, the telephone number is detected, stored and compared, but not limited to the telephone number, the name or other information entered from the telephone line may be similarly utilized.

In the embodiment, the line for entering the telephone number is a telephone line of a wired communication line, but it may be also realized by a wireless communication line. In such a case, the telephone apparatus is a cellular phone.

Also in the embodiment, when coinciding with the telephone number registered in group, the red LED 19b is lit, but only when coinciding with the telephone number stored in the memory 11, the LED 19b may be lit.

Or, by adding a blue LED for backlight, using three colors in total, it may be designed to light up the green LED when not coinciding with the telephone number stored in the memory 11, light up the blue LED when coinciding with the telephone number stored in the memory 11 but not coinciding with the telephone number registered in group, and light up the red LED when coinciding with the telephone number registered in group.

(Embodiment 3)

The telephone apparatus in this embodiment comprises plural sub units, and is designed to call a specific sub unit automatically to a specific caller at the bell incoming. It hence eliminates both receiver's trouble of manual exchange operation, and caller's trouble of remote control operation.

Figure 8:
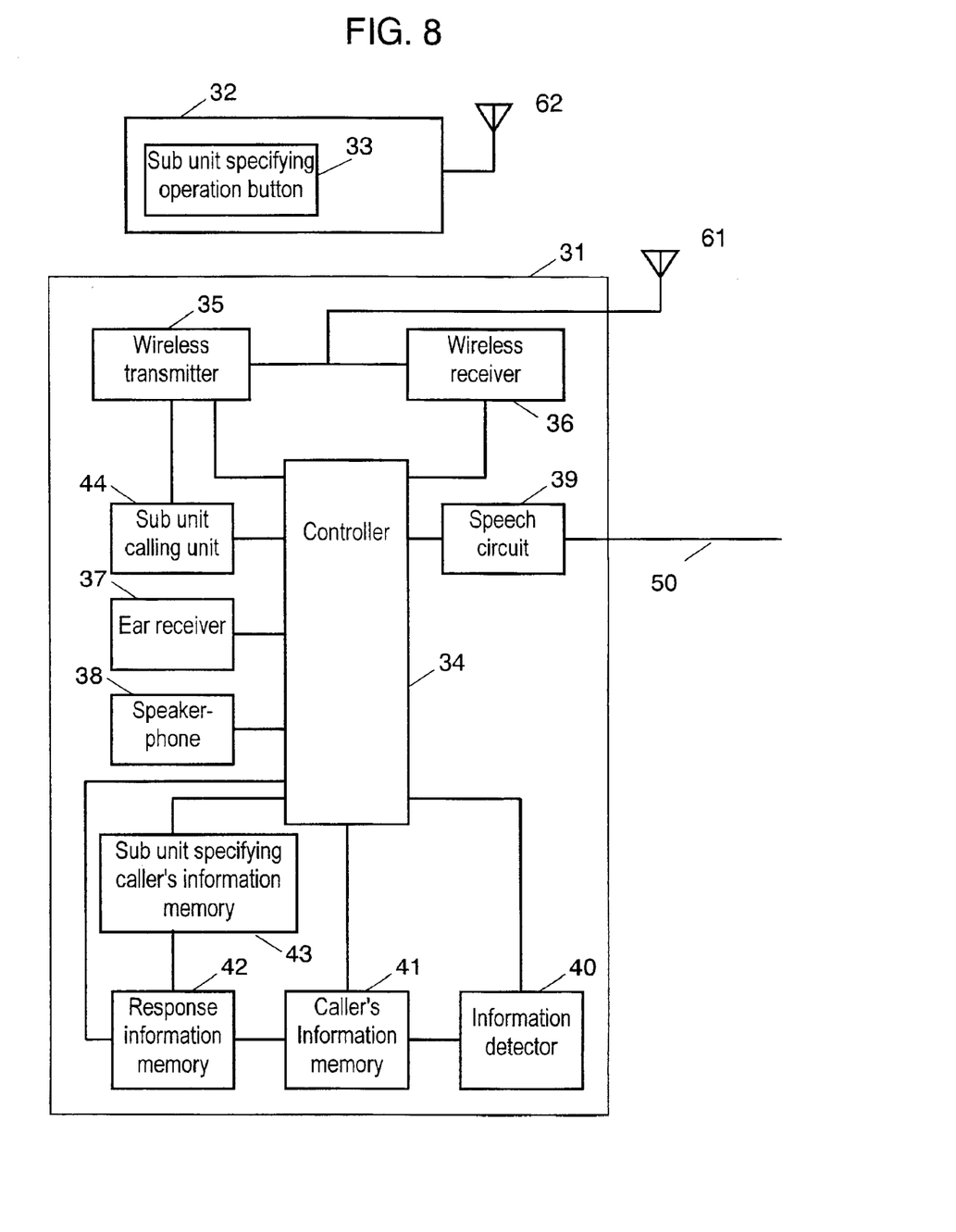
FIG. 8 is a block diagram of a telephone apparatus in a third embodiment of the invention.
Figure 9:
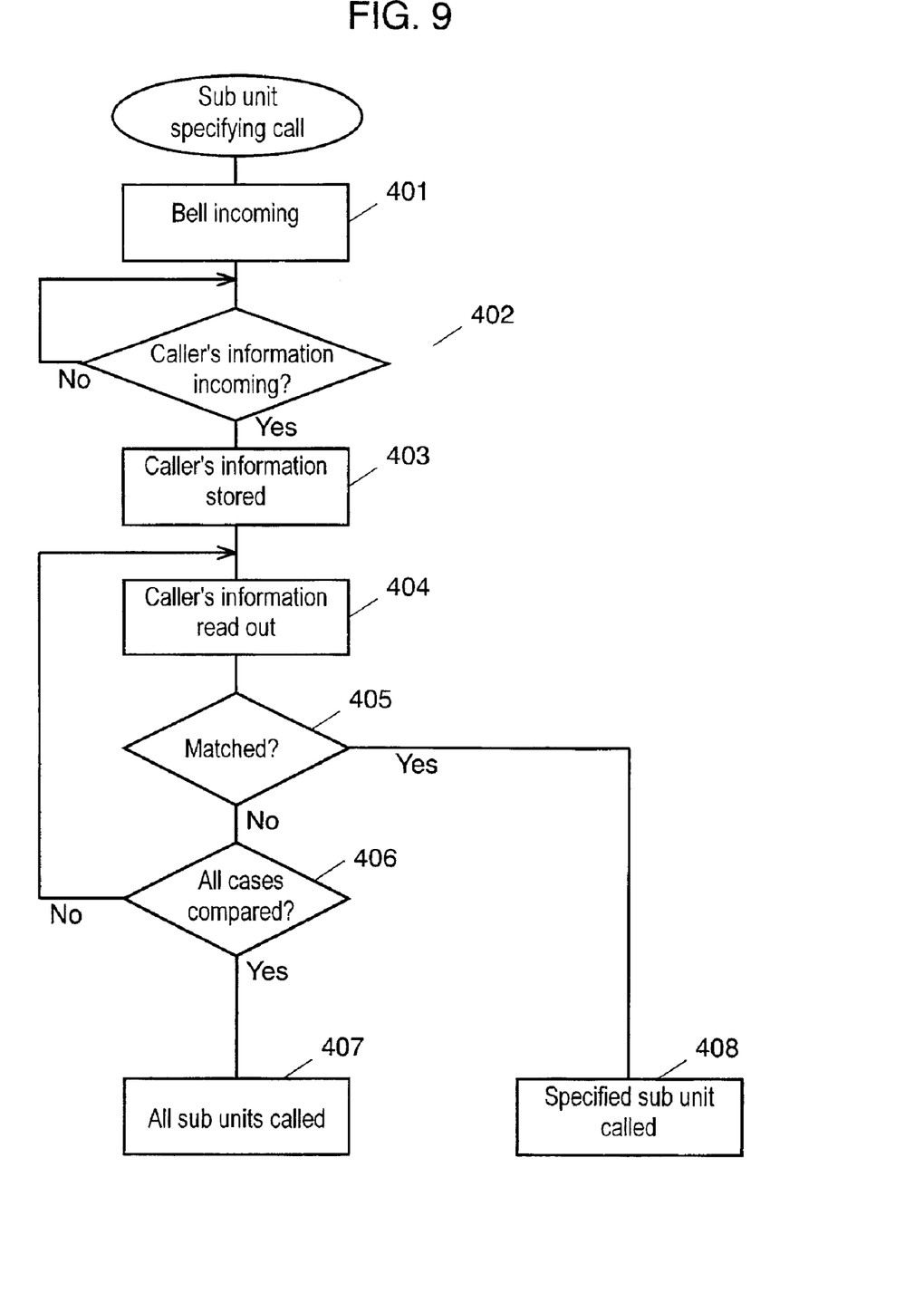
FIG. 9 is a flowchart showing the operation of the telephone apparatus in the third embodiment of the invention.
Figure 10:
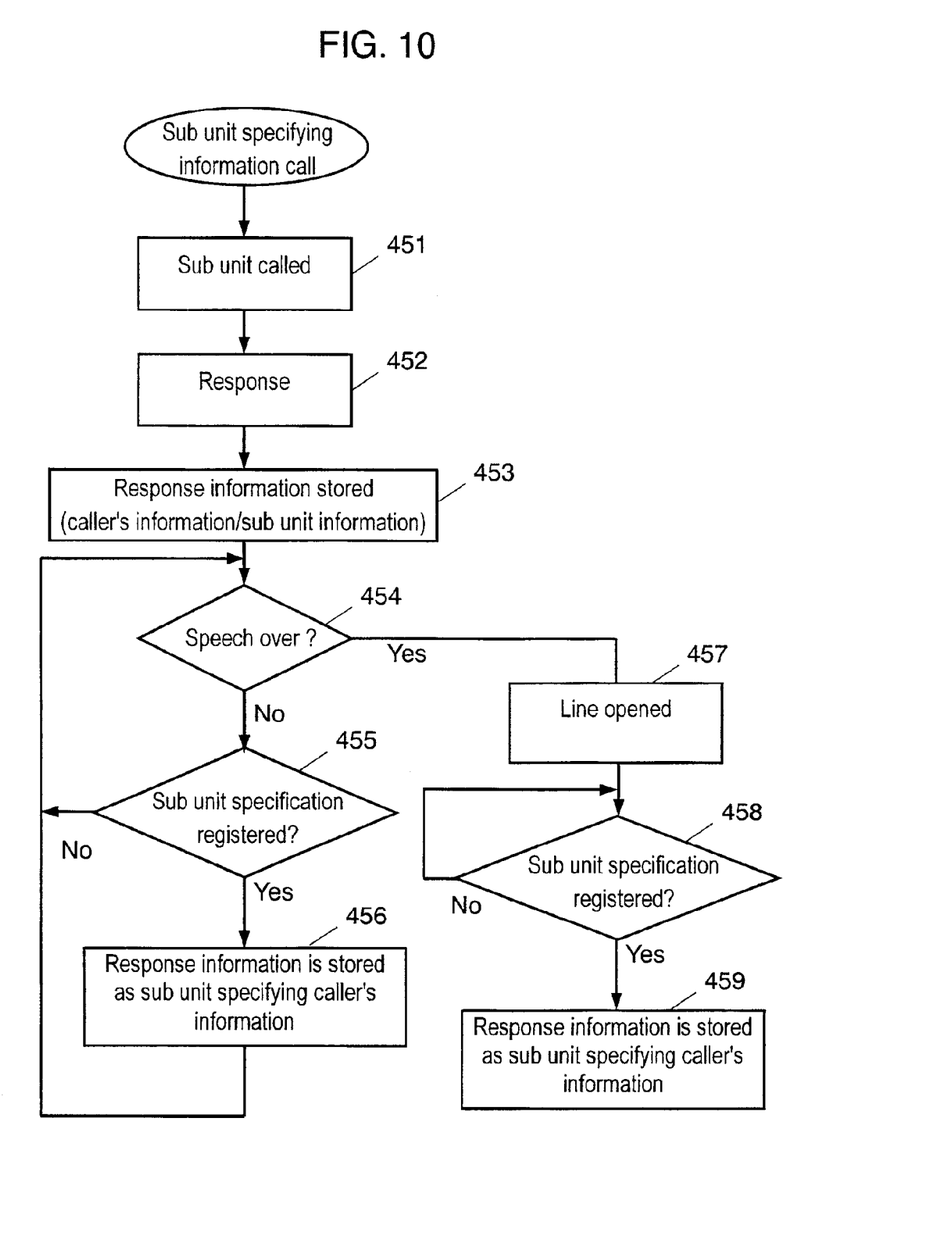
FIG. 10 is a flowchart showing the operation of the telephone apparatus in the third embodiment of the invention.

FIG. 8 is a block diagram of a telephone apparatus in embodiment 3 of the invention. FIG. 9 and FIG. 10 are flowcharts showing the operation of the telephone apparatus in the embodiment.

The telephone apparatus of the embodiment comprises a main unit 31, and a plurality of sub units 32A, 32B, 32C (sub unit 32B, 32C not shown), and the main unit 31 and sub units 32A to 32C communicate by wireless.

The sub units 32A to 32C include a sub unit specifying operation button 33 for generating a sub unit specifying signal for specifying and instructing a sub unit, and an antenna 62.

The main unit 31 comprises a controller 34 for controlling the entire system, a wireless transmitter 35 for sending out a transmission signal, a wireless receiver 36 for issuing a reception signal, an telephone receiver 37 for talking through a line 50 by lifting from the hook, a speaker-phone 38 for allowing hand-free talk, a speech circuit 39 for connecting with the line 50, an information detector 40 for detecting the caller's information sent from the caller side, a caller's information memory 41 for storing the caller's information received in the caller's information detector 40, a response information memory 42 for storing the sub unit information and caller's information, a sub unit specifying caller's information memory 43 for storing the caller's information for the purpose of calling only a specific sub unit, a sub unit calling unit 44 for calling a sub unit, and a antenna 61.

The main unit 31 and sub units 32A to 32C can communicate with each other by remote control within a specific distance (100 to 150 m). In FIG. 8, for the sake of simplicity, the telephone apparatus is shown to correspond to one line, but it may also correspond to two or more lines.

When the telephone receiver 37 is lifted and off hook, the main unit 31 can communicate with any one of the sub units 32A to 32C by cordless service (extension service) or service with the line 50 through the speech circuit 39. Besides, by pressing a switch (not shown) of the speaker-phone 38 to lift off hook, hand-free speech is also possible.

When the caller's information is sent together with the call bell from the line 50, the controller 34 operates immediately, and the information detector 40 detects the received caller's information. The caller's information is stored in the caller's information memory 41. The controller 34 compares the caller's information stored this time in the caller's information memory 41, and the caller's information stored in the sub unit specifying caller's information memory 43 for the purpose of calling a specific sub unit.

As a result of comparison, if the matched caller's information is not found in the sub unit specifying caller's information memory 43, the operation is as explained below. The sub unit calling unit 44 operates the wireless transmitter 35, and calls all sub units 32A to 32C to tell the incoming call. In this case, for example, when the sub unit 32A answers the call, the controller 34 operates the wireless transmitter 35 and wireless receiver 36, and communicates by cordless service. The controller 34 stores the sub unit information (e.g. sub unit number) of the answering sub unit 32A and caller's information in the response information memory 42. In other case, the user of the sub unit 32A answering in the first is not the object of the call, and the call may be transferred to the sub unit 32B of the object of the call. In this case, the controller 34 newly stores the sub unit information of the sub unit 32B and caller's information in the response information memory 42.

When the user of the sub unit 32A registers the caller's information for showing a specific caller in order to keep privacy with the caller or other reason during speech, the sub unit specifying operation button 33 of the sub unit 32A is pressed. The sub unit specifying operation button 33 generates a sub unit specifying signal. The controller 34 detects the sub unit specifying signal, and stores the sub unit information and caller's information of the sub unit 32A stored in the response information memory 42 in the sub unit specifying caller's information memory 43. Herein, the sub unit specifying operation button 33 is pressed during call, but it may be also operated after call.

Next, when the received caller's information coincides with the caller's information stored in the sub unit specifying caller's information memory 43, the operation is as follows. The sub unit calling unit 44 operates the wireless transmitter 45, and calls by bell incoming the specific sub unit stored in the sub unit specifying caller's information memory 43, for example, sub unit 32C. Hence, it is possible to communicate with the sub unit 32C.

Referring now to FIG. 9, the sub unit specifying call processing in the telephone apparatus of the embodiment is explained below.

The controller 34 is informed from the speech circuit 39 that the bell is incoming from the line 50 (step 401), and judges if caller's information is transmitted or not (step 402). If it is judged that caller's information is not transmitted, the process returns to step 402. That is, it is in the waiting state. When it is judged at step 402 that the caller's information is transmitted, the controller 34 stores the transmitted caller's information in the caller's information memory 41 (step 403).

Next, the controller 34 reads out the caller's information and sub unit information stored in the sub unit specifying caller's information memory 43 by one case each (step 404), and compares the incoming caller's information and the caller's information being read out, and judges if matched or not (step 405). If matched, the controller 34 instructs the sub unit calling unit 44 to call only the sub unit corresponding to the sub unit information being read out from the sub unit specifying caller's information memory 43 (step 408). If not matched, it is judged if all cases are completely compared or not (step 406). When all cases are not compared completely, the process returns to step 404. Next sub unit specifying caller's information is read out. If compared completely, all sub units are called (step 407).

When the user of the sub unit registers the caller's information as a specific caller, the operation is as shown in FIG. 10. FIG. 10 is a flowchart showing the process following step 407. The registration of sub unit specifying caller's information is processed when all sub units 32A to 32C are called.

The controller 34 calls all sub units 32A to 32C through the sub unit calling unit 44 (step 451). For example, when the sub unit 32A answers (step 452), the sub unit information of the sub unit 32A and the transmitted caller's information are stored in the response information memory 42 (step 453). Consequently, the controller 34 judges if the speech end operation or not (step 454). If judged not speech end operation, it is judged that the sub unit specifying registration operation is present or not (step 455). If judged the sub unit specifying registration operation is not present, the process returns to step 454. If judged the sub unit specifying registration operation is present, as the caller specifying the sub unit, the caller's information is stored in the sub unit specifying caller's information memory 43 (step 456), the process returns to step 454.

At step 454, if judged the speech end operation is present, the line 50 is opened (step 457), and it is judged whether the sub unit specifying registration operation is present or not (step 458). If judged the sub unit specifying registration operation is not present, the process returns to step 458. That is, it is set in waiting state. If judged the sub unit specifying registration operation is present at step 458, the caller's number is stored in the sub unit specifying caller's information memory 43 so as to show the caller specifying the sub unit (step 459).

Thus, according to the embodiment, when the controller 34 judges that the caller's information stored in the sub unit specifying caller's information memory 43 coincides with the transmitted caller's information, the sub unit corresponding to the matched caller's information is called through the sub unit calling unit 44. If the caller's information stored in the sub unit specifying caller's information memory 43 and the transmitted caller's information are judged not to coincide with each other, all sub units are called through the sub unit calling unit 44. Of all called sub units, the sub unit information of the answering sub unit and the caller's information are stored in the response information memory 42. The sub unit information and caller's information stored in the response information memory 42 on the basis of the sub unit specifying instruction signal from the sub unit, during connection or after disconnection, can be stored in the sub unit specifying caller's information memory 43. Hence, it is possible to register the caller in speech or the caller after speech as the caller for a specific sub unit by a simple operation. Afterwards, at the time of bell incoming call from the registered caller, the sub unit desired by the caller can be automatically called without receiver's manual switching operation or caller's switch operation by remote control. Besides, if the user of the called specific sub unit is absent, the call charge is not applied to the caller, and also similar call is possible in the telephone apparatus not provided with remote control switching function, and hence the privacy is sufficiently protected.

What is claimed is:

1. A telephone apparatus comprising:

a bell signal detector for detecting a bell signal transmitted from a telephone line, an information detector for detecting caller information inserted in a pause period of the bell signal transmitted from telephone line, a display unit for displaying the caller information received during the telephone call, a memory for storing the transmitted caller information displayed in said display unit, a light source for emitting a plurality of color lights, and a controller for controlling said light source, wherein said light source emits a first color light of said plurality of color lights when said bell signal detector detects the bell signal, and said light source emits a second color light of said plurality of color lights when the caller information detected by said information detector coincides with caller information stored in said memory, and said light source emits a third color light of said plurality of color lights when the caller information detected by said information detector coincides with a telephone number registered in a group.

2. The telephone apparatus of claim 1, wherein said display unit displays said transmitted caller information, said memory stores said transmitted caller information which displayed in said display unit relating to a caller group, wherein said light source emits a third color light when the information detected by said information detector coincides with the information relating to the caller group stored in said memory.

3. The telephone apparatus of claim 2, wherein the caller information stored in said memory contains at least a telephone number.

4. The telephone apparatus of claim 1, wherein the caller information stored in said memory contains at least a telephone number.

5. A telephone apparatus according to claim 1, wherein said information detector detects said transmitted caller information from a telephone line.

* * * * *